United States Patent
Goda et al.

(10) Patent No.: US 10,647,337 B2
(45) Date of Patent: May 12, 2020

(54) SOFTWARE GENERATING DEVICE

(71) Applicant: MITSUBISHI ELECTRIC CORPORATION, Chiyoda-ku, Tokyo (JP)

(72) Inventors: Hiromi Goda, Tokyo (JP); Tetsuo Komura, Tokyo (JP); Tokiko Shibasaki, Tokyo (JP); Ryoichi Watanabe, Tokyo (JP); Yosuke Asai, Tokyo (JP); Yoshiaki Fujimoto, Tokyo (JP); Eisho Ando, Tokyo (JP); Norishige Emoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 158 days.

(21) Appl. No.: 15/540,079

(22) PCT Filed: Jan. 20, 2015

(86) PCT No.: PCT/JP2015/051369
§ 371 (c)(1),
(2) Date: Jun. 27, 2017

(87) PCT Pub. No.: WO2016/117025
PCT Pub. Date: Jul. 28, 2016

(65) Prior Publication Data
US 2017/0369084 A1 Dec. 28, 2017

(51) Int. Cl.
*B61L 15/00* (2006.01)
*B61L 25/02* (2006.01)
(Continued)

(52) U.S. Cl.
CPC ............ *B61L 15/009* (2013.01); *B61C 17/00* (2013.01); *B61D 27/0018* (2013.01);
(Continued)

(58) Field of Classification Search
CPC ............... B61L 15/009; B61L 15/0036; B61L 15/0072; B61L 15/0081; B61L 25/02;
(Continued)

(56) References Cited

U.S. PATENT DOCUMENTS

2011/0095899 A1* 4/2011 Saito ................... B61L 15/0036
340/691.6

FOREIGN PATENT DOCUMENTS

JP 63-273914 A 11/1988
JP 08-033106 A 2/1996
(Continued)

OTHER PUBLICATIONS

International Search Report (PCT/ISA/210) dated Apr. 21, 2015, by the Japanese Patent Office as the International Searching Authority for International Application No. PCT/JP2015/051369.
(Continued)

*Primary Examiner* — Aaron L Troost
(74) *Attorney, Agent, or Firm* — Buchanan, Ingersoll & Rooney PC

(57) ABSTRACT

A plurality of apparatuses mounted on cars are monitored and controlled by control devices mounted on the cars. A display device capable of displaying apparatus information of the apparatuses is mounted on a driver's cab. A display screen of the display device is configured by arranging a plurality of display components by which apparatus information of each of the apparatuses can be displayed. A software generating device determines arrangement positions of the display components arranged on the display screen, automatically generates layout design data of the display screen, and automatically generates software for generating the display screen on the basis of the layout design data. The arrangement positions of the display components respectively representing the apparatuses when a
(Continued)

number of apparatuses of the same type are monitored and controlled by one and the same control device are determined according to arrangement rule information that is exceptional rules.

8 Claims, 9 Drawing Sheets

(51) Int. Cl.
*G06F 8/30* (2018.01)
*B61C 17/00* (2006.01)
*B61D 27/00* (2006.01)
*G06F 9/445* (2018.01)
*G06F 11/30* (2006.01)
*G06F 11/32* (2006.01)

(52) U.S. Cl.
CPC ....... *B61L 15/0036* (2013.01); *B61L 15/0072* (2013.01); *B61L 15/0081* (2013.01); *B61L 25/02* (2013.01); *G06F 8/30* (2013.01); *G06F 9/44505* (2013.01); *G06F 11/3013* (2013.01); *G06F 11/324* (2013.01)

(58) Field of Classification Search
CPC .... B61C 17/00; B61D 27/0018; B61D 37/00; G06F 8/30; G06F 9/44505; G06F 11/3013; G06F 11/324

See application file for complete search history.

(56) References Cited

FOREIGN PATENT DOCUMENTS

| | | | |
|---|---|---|---|
| JP | 2001-297015 | A | 10/2001 |
| JP | 2005-258916 | A | 9/2005 |
| JP | 2008-287365 | A | 11/2008 |
| JP | 2009-101964 | A | 5/2009 |
| JP | 2009101964 | A * | 5/2009 |
| JP | 2012-159943 | A | 8/2012 |
| JP | 2012159943 | A * | 8/2012 |

OTHER PUBLICATIONS

Written Opinion (PCT/ISA/237) dated Apr. 21, 2015, by the Japanese Patent Office as the International Searching Authority for International Application No. PCT/JP2015/051369.

* cited by examiner

FIG.4

| FORMATION PATTERN NAME | SYSTEM CONFIGURATION | | | | | | | | |
|---|---|---|---|---|---|---|---|---|---|
| SIX-CAR FORMATION | CONTROL DEVICE (1) | CONTROL DEVICE (2) | CONTROL DEVICE (3) | CONTROL DEVICE (4) | CONTROL DEVICE (5) | CONTROL DEVICE (6) | | | |
| FOUR-CAR FORMATION | CONTROL DEVICE (7) | CONTROL DEVICE (8) | CONTROL DEVICE (9) | CONTROL DEVICE (10) | | | | | |
| TEN-CAR FORMATION | CONTROL DEVICE (1) | CONTROL DEVICE (2) | CONTROL DEVICE (3) | CONTROL DEVICE (4) | CONTROL DEVICE (5) | ⋯ | ⋯ | ⋯ | CONTROL DEVICE (10) |

|  | CONTROL DEVICE NUMBER | | | | | | | |
|---|---|---|---|---|---|---|---|---|
| MONITORED AND CONTROLLED OBJECT APPARATUS NAME | | 1 | 2 | 3 | 4 | 5 | 6 | ⋯ | 10 |
| | DOOR | 8 | 8 | 8 | 8 | 8 | 8 | ⋯ | 8 |
| | MASTER CONTROLLER | 1 | 0 | 0 | 0 | 0 | 1 | ⋯ | 1 |
| | AIR-CONDITIONING CONTROL APPARATUS | 2 | 0 | 2 | 0 | 2 | 0 | ⋯ | 0 |
| | VVVF | 0 | 2 | 0 | 2 | 0 | 0 | ⋯ | 0 |
| | BRAKE | 1 | 1 | 1 | 1 | 1 | 1 | ⋯ | 1 |
| | SIV | 0 | 0 | 1 | 0 | 0 | 0 | ⋯ | 0 |

DISPLAY COMPONENT

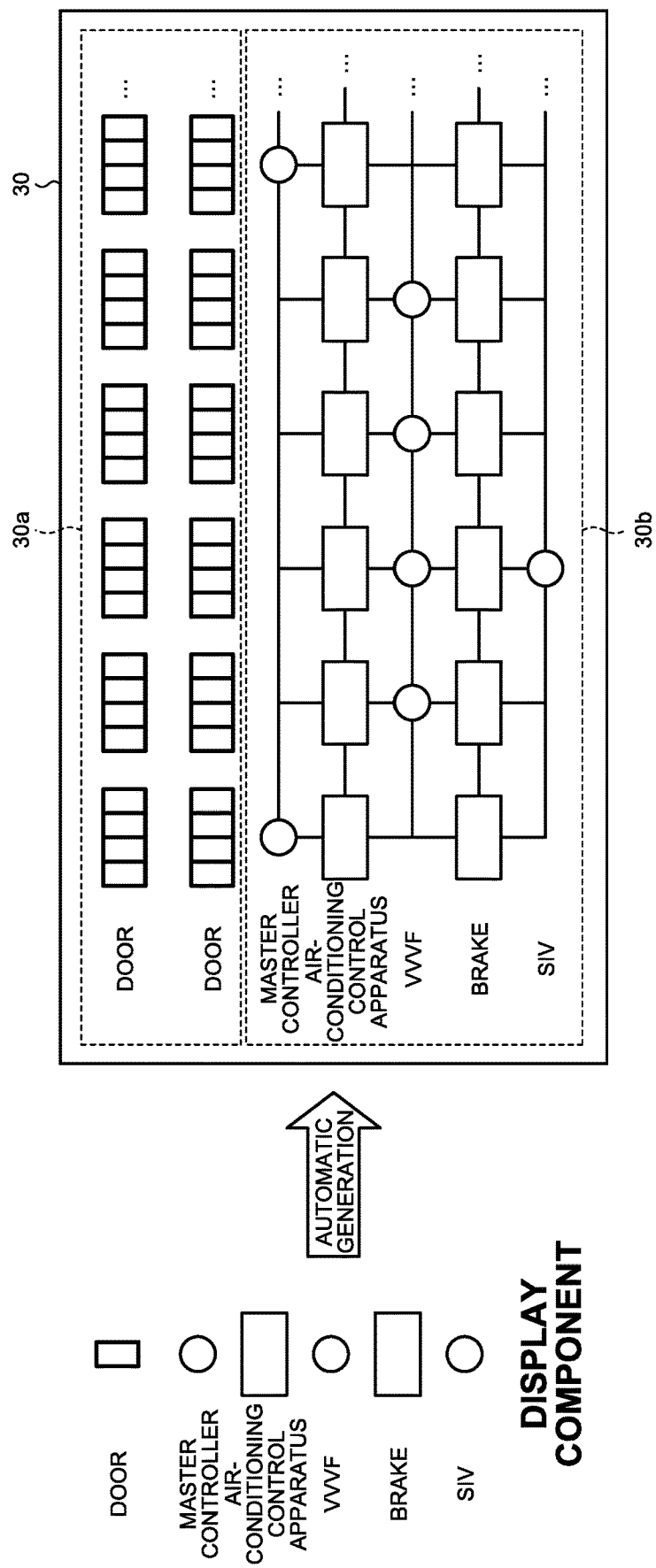

FIG.8

| CONTROL DEVICE NUMBER | 1 | 2 | 3 | 4 | 5 | ... | 10 |
|---|---|---|---|---|---|---|---|
| X COORDINATE | 10 | 20 | 30 | 40 | 50 | ... | 100 |

(a)

| APPARATUS NAME | DOOR | MASTER CONTROLLER | AIR-CONDITIONING CONTROL APPARATUS | VVVF | BRAKE | SIV |
|---|---|---|---|---|---|---|
| Y COORDINATE | 60 | 50 | 40 | 30 | 20 | 10 |

ARRANGEMENT RULES FOR DISPLAY COMPONENTS OF DOORS
[n<5-TH DISPLAY COMPONENT]
Y:SAME AS DEFINED POSITION
X:DEFINED POSITION+2.5×(n-3)
[n≥5-TH DISPLAY COMPONENT]
Y:DEFINED POSITION+20
X:DEFINED POSITION+2.5×(n-3)

(a)

11b

ARRANGEMENT RULES FOR DISPLAY COMPONENTS OF AIR-CONDITIONING CONTROL APPARATUSES OR VVVFS
[FIRST DISPLAY COMPONENT]
Y:SAME AS DEFINED POSITION
X:SAME AS DEFINED POSITION
[SECOND DISPLAY COMPONENT]
Y:SAME AS DEFINED POSITION
X:DEFINED POSITION HAVING (CONTROL DEVICE NUMBER+1)

(b)

SOFTWARE GENERATING DEVICE

FIELD

The present invention relates to a software generating device that automatically generates software for generating a display screen for railroad vehicle information.

BACKGROUND

Conventionally, a number of control devices communicatively connected to one another to respectively monitor and control a number of apparatuses have been mounted on a formation of a train. A display device for vehicle information display is provided in a driver's cab of the train. Monitoring and control information of the apparatuses monitored and controlled by the control devices is displayed on the display device.

Patent Literature 1 describes a railroad-vehicle managing device that automatically generates a display screen for railroad vehicle information by retaining, in advance, a group of image files composed on parts in units of a formation, a car, and an apparatus mounted on the car and combining a number of image files on the basis of a group of definition files describing screen display information in units of the formation, the car, and the apparatus.

CITATION LIST

Patent Literature

Patent Literature 1: Japanese Patent Application Laid-Open No. 2009-101964

SUMMARY

Technical Problem

When software applied to the conventional display device, that is, software for generating a display screen for vehicle information is created by a user interface design tool, in general, a group of display components capable of displaying apparatus information is created in advance, layout design of the display screen for the vehicle information is performed by arranging and configuring a plurality of display components on the display screen of the user interface design tool, and information concerning the layout design is incorporated in the software.

However, according to such a screen generating method, because the display components are arranged and configured by manual work, positional deviation of a display component easily occurs and work efficiency is poor. Because an arrangement man-hour for the display components occurs for each system configuration of a train, a screen generation man-hour increases according to the number of system configurations of trains.

On the other hand, Patent Literature 1 describes the railroad-vehicle managing device that automatically generates a display screen for railroad vehicle information, but does not particularly describe a method of automatically generating a display screen when one and the same control device monitors and controls a plurality of apparatuses of the same type. When the screen generating method described in Patent Literature 1 is used, it is difficult to efficiently display, in one and the same screen, apparatus information concerning a plurality of the same type of apparatuses monitored and controlled by one and the same control device together with apparatus information of other apparatuses.

The present invention has been devised in view of the above circumstances, and an object of the present invention is to provide a software generating device capable of automatically generating software for generating a display screen for apparatus information collected by a distributed control system for a train, formed by a plurality of control devices that respectively monitor and control a number of apparatuses, including the case where one and the same control device monitors and controls a plurality of apparatuses of the same type.

Solution to Problem

In order to solve the above-mentioned problems and achieve the object, the present invention provides a software generating device that automatically generates software for generating a display screen of a display device in a train in which control devices communicatively connected to one another are mounted on cars, a plurality of apparatuses mounted on the cars is monitored and controlled by the control devices, and the display device capable of displaying apparatus information of the apparatuses is mounted on a driver's cab, the software generating device comprising: a system-configuration-information storing unit to store system configuration information for giving an arrangement configuration of the control devices in a formation of the train; an apparatus-arrangement-information storing unit to store apparatus arrangement information for giving an apparatus type of a monitored and controlled object and the number of apparatuses of the apparatus type for each of the control devices; a display-component storing unit to store display components by which apparatus information of the apparatuses can be displayed on the display screen; a display-component-arrangement-information storing unit to store display component arrangement information for defining arrangement positions of a plurality of display components arranged on the display screen; an arrangement-rule-information storing unit to store arrangement rule information for giving exceptional rules, which are arrangement rules for display components, applied in addition to the display component arrangement information in determining, when a plurality of apparatuses of the same type is monitored and controlled by one and the same control device, arrangement positions of a plurality of display components respectively representing the apparatuses; a layout unit to select a plurality of display components constituting the display screen, determine arrangement positions of the display components on the display screen, and automatically generate layout design data of the display screen, on the basis of the system configuration information, the apparatus arrangement information, the display component arrangement information, and the arrangement rule information; and a software generating unit to automatically generate software for generating the display screen on the basis of the layout design data.

Advantageous Effects of Invention

According to the present invention, there is an effect that it is possible to provide a software generating device capable of automatically generating software for generating a display screen for apparatus information collected by a distributed control system for a train, formed by a plurality of control devices that respectively monitor and control a number of apparatuses, the monitoring and control including monitoring and control of a plurality of apparatuses of the same type by the same control device, including the case where one and the same control device monitors and controls a plurality of apparatuses of the same type.

BRIEF DESCRIPTION OF DRAWINGS

FIG. 4 is a diagram showing an example of system configuration information.

FIG. 7 is an illustration schematically showing a state in which a display screen is automatically generated using the display component group.

FIG. 8 is a diagram showing an example of display component arrangement information.

FIG. 9 is a diagram showing an example of arrangement rule information.

DESCRIPTION OF EMBODIMENTS

A software generating device according to an embodiment of the present invention is explained in detail below with reference to the drawings. Note that the present invention is not limited by the embodiment.

Embodiment

Figure 1:
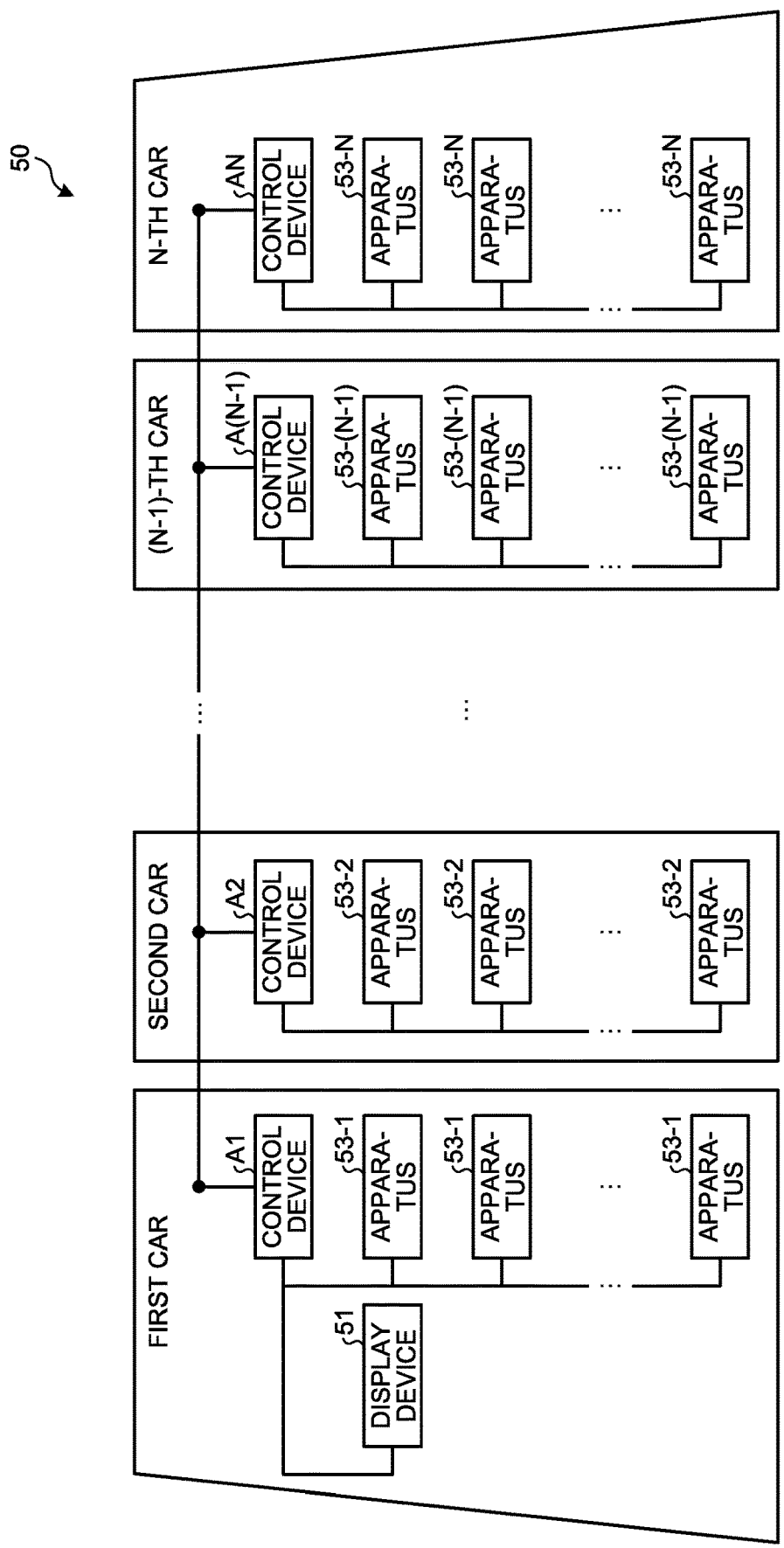
FIG. 1 is a diagram showing an example of a general system configuration of a formation of a train.

FIG. 1 is a diagram showing an example of a general system configuration for a formation of a train. As shown in FIG. 1, a train 50 is made up of N cars and is configured by cars of a first car to an N-th car. N is any natural number. In the example shown in FIG. 1, the first car is a leading car.

Control devices A communicatively connected to one another are mounted on the first car to the N-th car, respectively. The control devices A are train-information managing devices. Specifically, a control device A1 is mounted on the first car, a control device A2 is mounted on the second car, . . . , a control device A(N−1) is mounted on the (N−1)-th car, and a control device AN is mounted on the N-th car. In general, when i is any natural number satisfying 1≤i≤N, a control device Ai is mounted on an i-th car. Note that the control devices A1 to AN are collectively referred to as the control devices A.

The control device Ai is communicatively connected to a number of apparatuses 53-$i$ mounted on the i-th car, and monitors and controls the apparatuses 53-$i$. In general, the apparatuses 53-$i$ include apparatuses of different types and the same type. A specific example of the apparatuses 53-$i$ is explained below. For example, examples of the apparatuses in the first car include a master controller, a door, an air conditioning control apparatus, and a brake. Note that apparatuses mounted on the train are collectively referred to as apparatuses 53.

In the cars other than the leading car, the control device Ai receives state information from the apparatuses 53-$i$, and transmits the state information to the control device A1. In the leading car, the control device A1 receives the state information from the apparatuses 53-1.

The control device A1 transmits control commands respectively to the apparatuses 53-$i$ of the cars on the basis of the collected state information of the apparatuses 53. In particular, in the cars other than the leading car, the control commands are transmitted to the apparatuses 53-$i$ via the control devices Ai.

In this way, the control devices A1 to AN configure a distributed control system of the train. The control device A1 collects monitoring and control information of the apparatuses 53. The monitoring and control information refers to monitoring information and control information. The monitoring information is state information of the apparatuses 53. The control information is control command information to the apparatuses 53. In the following explanation, the monitoring and control information of the apparatuses is simply referred to as "apparatus information".

A display device 51 is provided in a not-shown driver's cab of the leading car. The display device 51 is connected to the control device A1, and receives apparatus information of the apparatuses 53-$i$ of the cars as input from the control device A1. The display device 51 can collect the apparatus information of the apparatuses 53-$i$ and display the apparatus information on a display screen. Information obtained by collecting the apparatus information of the apparatuses 53-$i$ is referred to as "vehicle information" as well. Note that, in a general configuration, the display device 51 is provided in the driver's cab, and also in general, another display device 51 is provided in a driver's cab of a rearmost car, for example.

Figure 2:
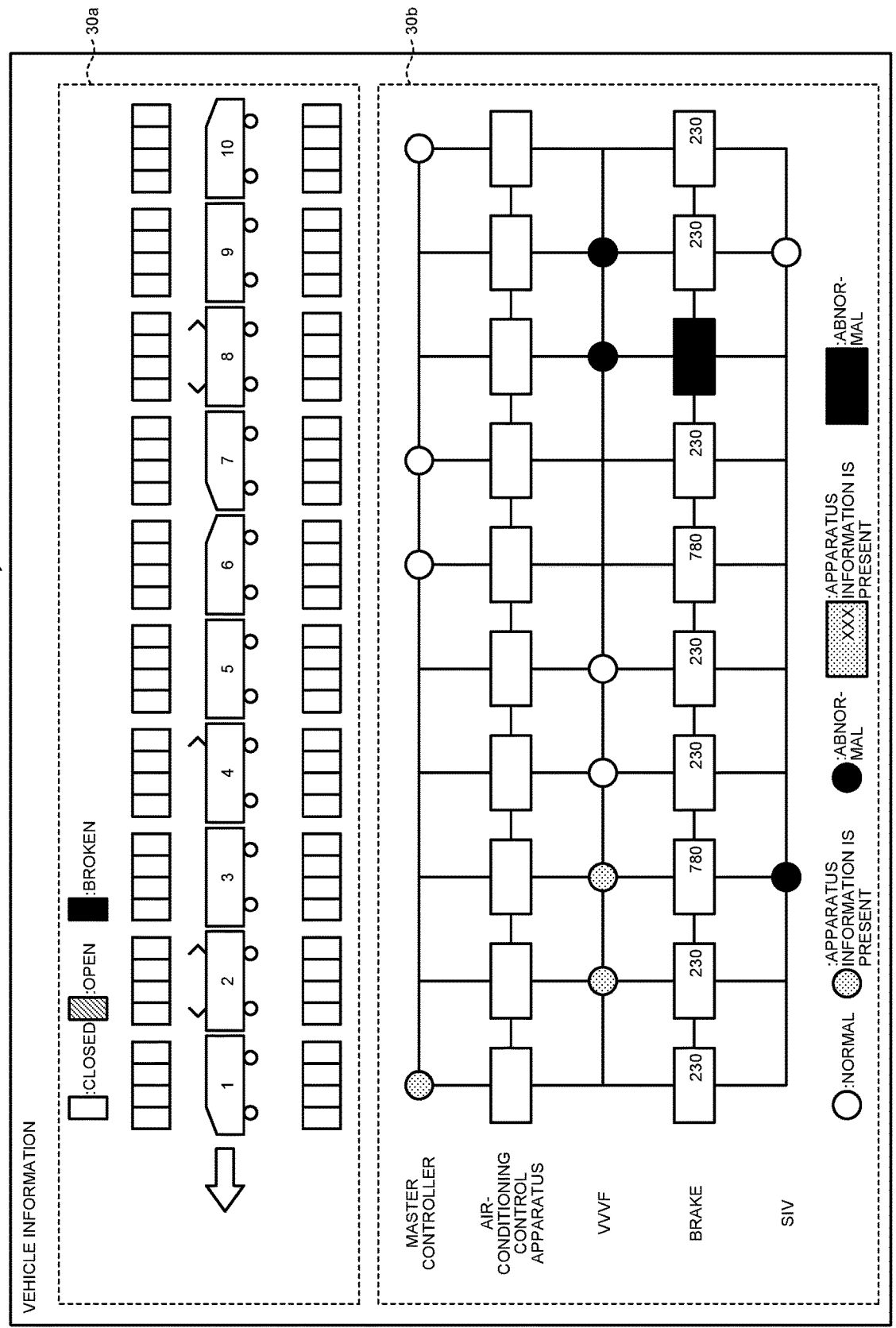
FIG. 2 is a diagram showing an example of a display screen of a display device.

FIG. 2 is a diagram showing an example of the display screen of the display device 51. Apparatus information of doors is displayed in an upper part 30a of a display screen 30. Specifically, for each of cars of formation display representing ten cars, rectangular display components representing the doors are displayed side by side above and below a car display. That is, in the illustrated example, eight display components in total representing the doors are arranged; four display components are arranged above a car display and four display components are arranged below the car display. This represents that eight doors are provided in an actual car. The display component of each door can be displayed to distinguish whether the door is in a closed state or an open state, or broken.

In a lower part 30b of the display screen 30, apparatus information of a master controller, an air-conditioning control apparatus, a VVVF, a brake, and an SIV is displayed. The VVVF specifically represents a VVVF (Variable Voltage Variable Frequency) inverter, which controls a not-shown motor. The SIV (Static Inverter) is an auxiliary power supply. Although explained in detail later, a plurality of vertical lines are displayed to correspond to the control devices A or cars, and a plurality of horizontal lines are displayed to correspond to a plurality of types of the apparatuses, wherein display components representing the apparatuses can be arranged in intersections of the vertical lines and the horizontal lines. Display components of the master controller, the VVVF, and the SIV are displayed as circles. Display components of the air-conditioning control apparatus and the brake are displayed as rectangles. The display components of the master controller, the VVVF, and the SIV can be displayed to distinguish whether the apparatuses are normal, have owned apparatus information, or are abnormal. The display components of the air-conditioning control apparatus and the brake can be displayed to distinguish whether the apparatuses are normal or abnormal. In this case, when the apparatuses are normal and have the apparatus information, numerical values concerning the apparatus information can be specifically displayed.

Figure 3:
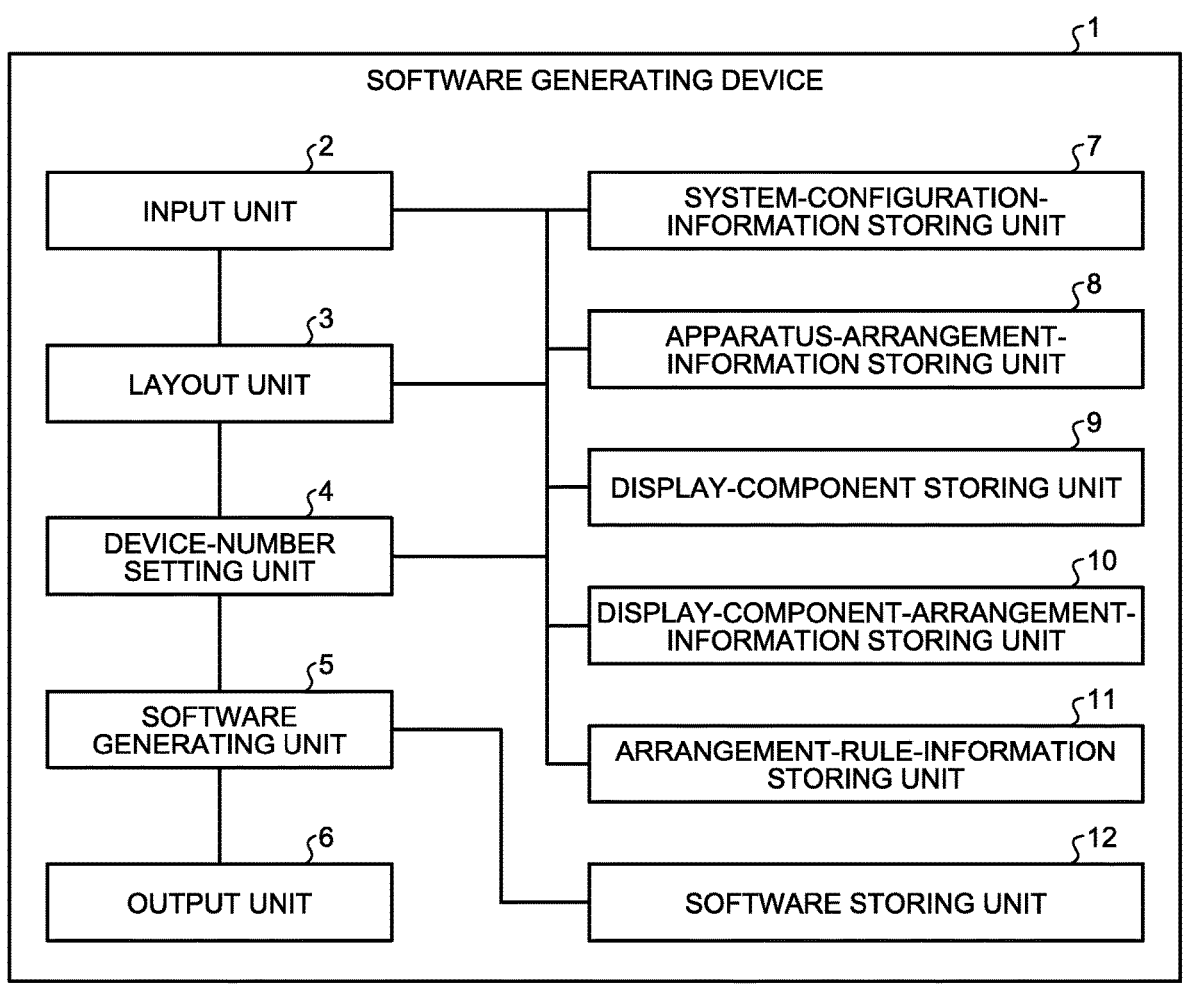
FIG. 3 is a block diagram showing an example of a configuration of a software generating device according to an embodiment.

A software generating device according to this embodiment is explained. FIG. 3 is a block diagram showing an example of a configuration of the software generating device according to this embodiment. A software generating device 1 is a device that automatically generates software for causing the display device 51 to display the display screen 30 as shown in FIG. 2. Note that the software generating device 1 can be realized by, for example, a computer.

As shown in FIG. 3, the software generating device 1 includes an input unit 2, a layout unit 3, a device-number setting unit 4, a software generating unit 5, an output unit 6, a system-configuration-information storing unit 7, an apparatus-arrangement-information storing unit 8, a display-component storing unit 9, a display-component-arrangement-information storing unit 10, an arrangement-rule-information storing unit 11, and a software storing unit 12.

The input unit 2 can receive input data. The input unit 2 is, for example, an input device that reads input data from a storage medium, a keyboard, and a mouse. The storage medium is, for example, a CD-ROM or a DVD disk.

The system-configuration-information storing unit 7 has stored therein system configuration information. The system configuration information is information for giving an arrangement configuration of the control devices A in the formation of the train. FIG. 4 is a diagram showing an example of the system configuration information. FIG. 4 indicates that the train has a ten-car formation formed by coupling a six-car formation and a four-car formation, that a control device (1), a control device (2), . . . , a control device (6) are mounted in order in cars of the six-car formation in the former half, and that a control device (7), a control device (8), . . . , and a control device (10) are mounted in order in cars of the four-car formation in the latter half. That is, FIG. 4 indicates that a system configuration of each of the "six-car formation" and the "four-car formation" is a partial configuration of a system configuration of the "ten-car formation". Numbers in the parentheses immediately following the control devices are serial numbers added to the control devices A from the leading car side toward the rearmost car side. In the following explanation, the serial numbers added to the control devices are referred to as "control device numbers". For example, the control device (2) has a control device number of 2. The control device numbers are identification information for specifying the control devices A. In correspondence with FIG. 1, the control device (1), the control device (2), . . . , and the control device (10) are respectively equal to the control device A1, the control device A2, . . . , and the control device A10. The control device number of the control device Ai mounted on the i-th car is i.

Note that the system configuration information only has to be at least information for giving an arrangement configuration of the control devices A in the formation. For example, when a train has a ten-car formation, the system configuration information only has to include at least information for giving an arrangement configuration of the control devices A in the ten-car formation. Further, the system configuration information can include information concerning a system configuration for a formation pattern divisible into detailed sub-information pieces as shown in FIG. 4, or concerning formation units constituting a formation.

Figures 5, 6:
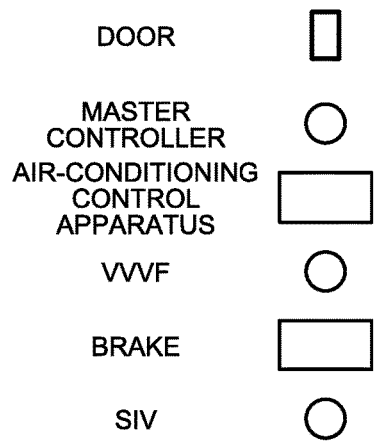
FIG. 5 is a diagram showing an example of apparatus arrangement information.
FIG. 6 is an illustration showing an example of a display component group.

The apparatus-arrangement-information storing unit 8 stores apparatus arrangement information. The apparatus arrangement information gives information concerning types of apparatuses to be monitored and controlled and the number of apparatuses of the apparatus type for each of the control devices A. FIG. 5 is a diagram showing an example of the apparatus arrangement information. In FIG. 5, names of the apparatuses to be monitored and controlled and the numbers of the apparatuses are given as table information for each control device number mentioned above.

As shown in FIG. 5, for example, the control device (1) has monitored and controlled objects of eight doors, one master controller, two air-conditioning control apparatuses, and one brake. Note that all of these several apparatuses monitored and controlled by the control device (1) are mounted on the first car. Besides, the control device (2) to the control device (10) can be explained in the same manner.

As shown in FIG. 5, each of the control devices (1) to (10) monitors and controls a plurality of doors that are apparatuses of the same type, specifically, eight doors. Each of the control devices (1), (3), (5), (7), and (9) monitors and controls a plurality of air-conditioning control apparatuses that are apparatuses of the same type, specifically, two air-conditioning control apparatuses. Further, each of the control devices (2), (4), and (8) monitors and controls a plurality of VVVFs that are apparatuses of the same type, specifically, two VVVFs. In this way, this embodiment includes an apparatus arrangement in which a number of apparatuses of the same type are monitored and controlled by one and the same control device.

The display-component storing unit 9 has stored therein display components capable of displaying apparatus information of the apparatuses 53 on the display screen 30. The display components are components capable of displaying the apparatuses 53 and displaying apparatus information of the apparatuses 53 on the display screen 30. Display data for displaying the display components is stored as display components in the display-component storing unit 9. A group of display components is stored in the display-component storing unit 9. FIG. 6 is an illustration showing an example of the display component group. In FIG. 6, there are illustrated display components respectively meaning a door, a master controller, an air-conditioning control apparatus, a VVVF, a brake, and an SIV. These display components are equal to the display components shown in FIG. 2. As shown in FIG. 2, for example, apparatus information can be displayed on the display component of the brake.

FIG. 7 is a diagram schematically showing a state in which the display screen is automatically generated using the display component group. That is, the display device 51 operating on the basis of software generated by the software generating device 1 arranges the display components on the display screen 30 when automatically generating the display screen 30. In FIG. 7, as in FIG. 2, display components of the doors are displayed side by side in the upper part 30a of the display screen 30, and display components of the mater controllers, the air-conditioning control apparatuses, the VVVFs, the brakes, and the SIVs are displayed in the lower part 30b of the display screen 30.

The display-component-arrangement-information storing unit 10 stores display component arrangement information.

The display component arrangement information is information for defining arrangement positions of the display components that are to be arranged on the display screen 30 and constitute the display screen 30. FIG. 8 is a diagram showing an example of the display component arrangement information.

In FIG. 8(*a*), there are given correspondence relations between control device numbers and X coordinates. The X coordinate is a first coordinate set on the display screen 30. The control device number corresponds to a car on which the control device is mounted. Therefore, a value of the X coordinate represents a position of the car on the display screen 30 or a position of the control device mounted on that car on the same. A number of display components arranged in positions of the same value of the X coordinate are intended to display the apparatuses 53 monitored and controlled by one and the same control device A. For example, the display components of the doors, the master controller, the air-conditioning control apparatuses, and the brake monitored and controlled by the control device (1) are arranged in positions where a value of the X coordinate is 10 on the display screen 30.

In FIG. 8(*b*), there are given correspondence relations between apparatus names and Y coordinates. The Y coordinate is a second coordinate set on the display screen 30 and is orthogonal to the X coordinate. Note that a position can be defined by an oblique coordinate system rather than an orthogonal coordinate system. The display components of the apparatuses 53 are arranged in positions having values of the Y coordinates given to correspond to the apparatus types. For example, the display component of the SIV is arranged in a position where a value of the Y coordinate is 10 on the display screen 30.

In this way, arrangement positions of the display components in an X-coordinate axis direction are given by values of the X coordinate corresponding to the control device numbers of the control devices A that control the apparatuses 53 represented by the display components or corresponding to the display components. Arrangement positions of the display components in a Y-coordinate axis direction are given by values of the Y coordinate corresponding to apparatus types of the apparatuses 53 represented by the display components or corresponding to the display components. Note that, in the following explanation, a value of the X coordinate or the Y coordinate of the display component given by the display component arrangement information is also referred to as a defined position. The defined position is defined concerning a predetermined position, for example, a center position of the display component.

The arrangement-rule-information storing unit 11 stores arrangement rule information. The arrangement rule information gives arrangement rules for the display components for respectively displaying a number of apparatuses 53 when the apparatuses 53 are pf the same type and monitored and controlled by one and the same control device A. Specifically, the arrangement rule information gives exceptional rules to be applied, which are arrangement rules for the display components, applied in addition to the display component arrangement information when arrangement positions of the display components respectively representing the apparatuses 53 are determined in the case where the apparatuses 53 of the same apparatus type are monitored and controlled by one and the same control device A.

FIG. 9 is a diagram showing an example of the arrangement rule information. In FIG. 9(*a*), there is shown an example of arrangement rule information 11*a* of the display component of the door. That is, when there are a plurality of doors monitored and controlled by one and the same control device A, concerning a "n<5"-th display component, the Y coordinate can be set the same as a defined position and the X coordinate can be set to a position obtained by adding, for example, 2.5×(n−3) to the defined position. Concerning a "n≥5"-th display component, the Y coordinate can be set to a position obtained by adding, for example, 20 to the defined position and the X coordinate can be set to a position obtained by adding, for example, 2.5×(n−3) to the defined position. In the above explanation, n is a number given to the display components representing the doors. Note that, in this case, the defined position of the X coordinate defines a position at the left end of the display components and the defined position of the Y coordinate defines a position of the center of the display components. A width of the display component in the X direction of the door is set to 2.5.

For example, since the control device (1) monitors and controls eight doors, display components of the eight doors are supposed to be arranged on the display screen 30. In this case, first to fourth display components are respectively arranged in positions where the Y coordinate is 60 and the X coordinate is 5.0, 7.5, 10.0, and 12.5. Fifth to eighth display components are respectively arranged in positions where the Y coordinate is 80 and the X coordinate is 5.0, 7.5, 10.0, and 12.5. In short, the arrangement positions of the display components are shifted from one another and the entire display components are respectively displayed such that all of the eight display components are displayed. In the arrangement rules for the display components of the doors, the arrangement positions of the doors are displaced from the defined position in the X-coordinate axis direction or the Y-coordinate axis direction, or in both of the directions.

In FIG. 9(*b*), there is shown an example of arrangement rule information 11*b* for the display components of the air-conditioning control apparatuses or the VVVFs. That is, when there are two air-conditioning control apparatuses or VVVFs monitored and controlled by one and the same control device A, concerning a first display component, both of the Y coordinate and the X coordinate are the same as the defined positions. Concerning a second display component, the Y coordinate is the same as the defined position and the X coordinate is the same as a defined position having (the control device number+1). In this case, both of the defined positions of the X coordinate and the Y coordinate are positions of the center of the display components.

Since the control device (1) monitors and controls the two air-conditioning control apparatuses, display components of the two air-conditioning control apparatuses are arranged on the display screen 30 to correspond thereto. In this case, concerning a first display component, the Y coordinate is 40 and the X coordinate is 10. That is, an arrangement position of the display component of the first air-conditioning control apparatus is the defined position given by the display component arrangement information shown in FIG. 8. Concerning a second display component, the Y coordinate is 40 and the X coordinate is the defined position of the control device (2), that is, 20. In short, the second display component is placed to be shifted from the first display component, specifically, placed in the defined position of the X coordinate in the case of the control device having the control device number larger than the control device number of the control device (1) by one so as not to overlap the first and second display components with each other and for the one display component not to hide the other.

Since the control device (2) monitors and controls the two VVVFs, display components of the two VVVFs are arranged on the display screen 30 to correspond thereto. In this case, concerning a first display component, the Y coordinate is 30 and the X coordinate is 20. That is, an arrangement position of the display component of the first VVVF is the defined position given by the display component arrangement information shown in FIG. 8. Concerning a second display component, the Y coordinate is 30 and the X coordinate is the defined position of the control device (3), that is, 30. In short, the second display component is arranged to be shifted from the first display component, specifically, arranged in the defined position of the X coordinate in the case of the control device having the control device number larger than the control device number of the control device (2) by one so as not to overlap the first and second display components with each other and for the one display component not to hide the other.

In this way, in the display component arrangement information, the arrangement positions of the display components arranged on the display screen 30 are defined by the X and Y coordinates orthogonal to each other set on the display screen 30. The positions in the X-coordinate axis direction of the display components are defined, for each of the control devices A that control the apparatuses 53 represented by the display components, in the order of the car numbers of the cars on which the apparatuses 53 and the control devices A are mounted. Further, the positions in the Y-axis coordinate axis direction of the display components are defined for each of the apparatus types of apparatuses represented by the display components. Additionally, in the arrangement rule information, when the apparatuses 53 of the same type are monitored and controlled by one and the same control device A, arrangement positions of the display components are given such that the arrangement positions of the display components are different from one another on the basis of the arrangement positions defined by the display component arrangement information concerning the apparatus types of the apparatuses 53.

Figure 10:
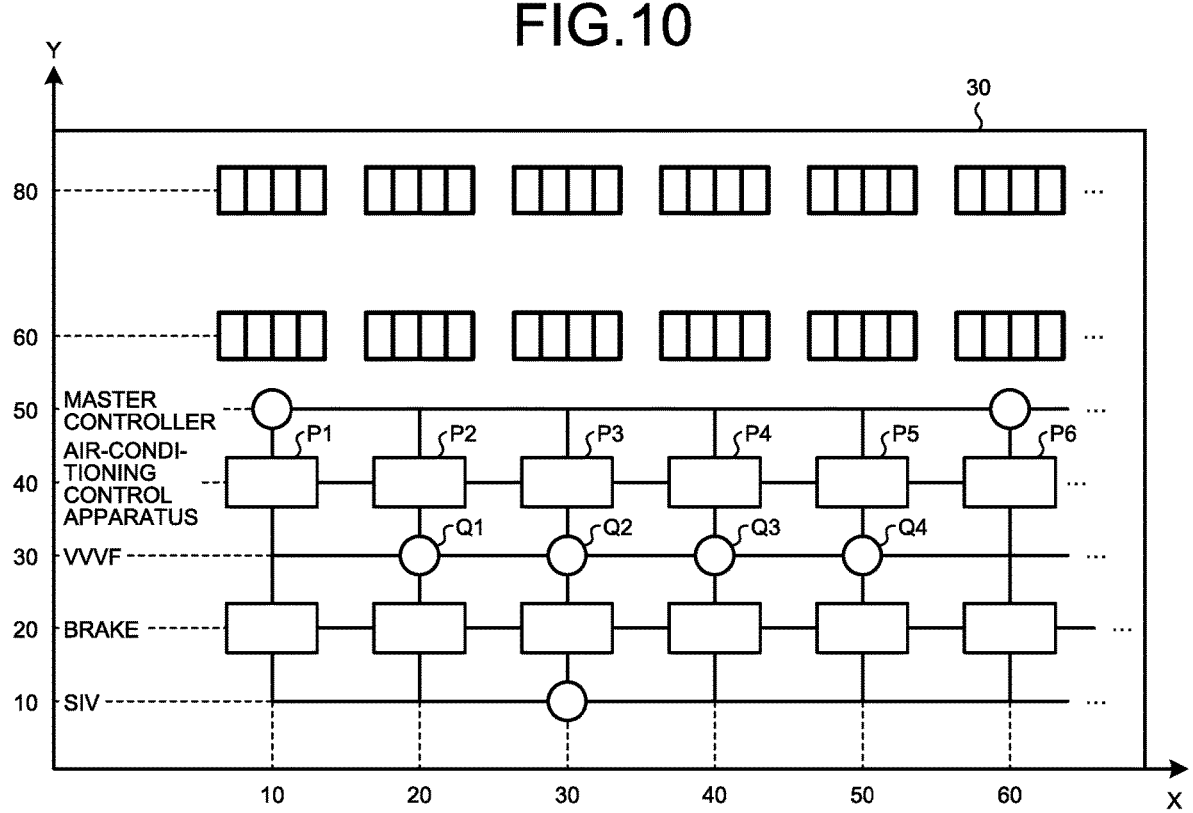
FIG. 10 is an illustration showing a display screen on which display components are arranged according to the display component arrangement information shown in FIG. 8 and the arrangement rule information shown in FIG. 9.

FIG. 10 is an illustration showing a display screen on which the display components are arranged according to the display component arrangement information shown in FIG. 8 and the arrangement rule information shown in FIG. 9.

Each of the control devices (1), (3), (5), (7), and (9) controls two air-conditioning control apparatuses. That is, two air-conditioning control apparatuses are mounted on one car of cars adjacent to each other, and an air-conditioning control apparatus is not mounted on the other car of the adjacent cars. Specifically, two air-conditioning control apparatuses are mounted on a car having an odd car number, but no air-conditioning control apparatus is mounted on a car having an even car number.

According to the arrangement rule information shown in FIG. 9, an arrangement position of a display component representing one air-conditioning control apparatus of two air-conditioning control apparatuses monitored and controlled by one and the same control device is given by an arrangement position defined by the display component arrangement information. An arrangement position of a display component representing the other air-conditioning control apparatus is given by an arrangement position defined by the display component arrangement information in the Y-coordinate axis direction. That is, a value of the Y coordinate of the display component representing the other air-conditioning control apparatus is equal to a value of the Y coordinate of the display component representing the one air-conditioning control apparatus. Further, the arrangement position of the display component representing the other air-conditioning control apparatus is given by an arrangement position defined by the display component arrangement information concerning the control device having the (control device number+1) in the X-coordinate axis direction. That is, a value of the X coordinate of the display component representing the other air-conditioning control apparatus is equal to a value of the X coordinate defined by the display component arrangement information concerning a control device mounted on the adjacent car having a car number larger than a car number of the one car by one or an apparatus of a monitored and controlled object of the control device.

That is, the other air-conditioning control apparatus is displayed on the display screen 30 as if the other air-conditioning control apparatus is controlled by the control device having the (control device number+1) and mounted on the car having the car number larger than the car number of the one car by one. Such display is allowed because an air-conditioning control apparatus is not mounted on the car having the even car number.

In FIG. 10, each of display components P1, P3, and P5 of the air-conditioning control apparatus is a first display component, and is placed in a position of the X coordinate corresponding to a car on which the air-conditioning control apparatus is actually mounted or a control device by which the air-conditioning control apparatus is actually controlled. On the other hand, each of the display components P2, P4, and P6 of the air-conditioning control apparatus is a second display component, and is placed in a position of the X coordinate corresponding to a car resting on the right of the car on which the air-conditioning control apparatus is actually mounted or a control device mounted on the car resting on the right. As explained above, such arrangement of the display components of the air-conditioning control apparatuses is based on the premise that two air-conditioning control apparatuses are mounted for every two cars.

One air conditioner (not shown in the figure), which is a controlled object of the air-conditioning control apparatus, is mounted on each of the adjacent cars. Therefore, even if two air-conditioning control apparatuses are displayed on the display screen 30 as if the two air-conditioning control apparatuses are mounted on cars on which two air conditioners (not shown in the figure), which are the controlled objects, are respectively mounted, the display does not cause misunderstanding of a person viewing the display screen 30.

Each of the control devices (2), (4), and (8) controls two VVVFs. That is, two VVVFs are mounted on a car having a car number 2, 4, or 8. VVVFs are not mounted on the other cars.

According to the arrangement rule information shown in FIG. 9, an arrangement position of a display component representing one VVVF of the two VVVFs monitored and controlled by one and the same control device is given by an arrangement position defined by the display component arrangement information. An arrangement position of a display component representing the other VVVF is given by an arrangement position defined by the display component arrangement information in the Y-coordinate axis direction. That is, a value of the Y coordinate of the display component representing the other VVVF is equal to a value of the Y coordinate of the display component representing the one VVVF. Further, the arrangement position of the display component representing the other VVVF is given by an arrangement position defined by the display component arrangement information concerning the control device having the (control device number+1) in the X-coordinate axis direction. That is, a value of the X coordinate of the display component representing the other VVVF is equal to a value of the X coordinate defined by the display component arrangement information concerning a control device mounted on an adjacent car having a car number larger than a car number of a car by one or an apparatus that is a monitored and controlled object of the control device.

Therefore, the other VVVF is displayed on the display screen 30 as if the other VVVF is controlled by the control device having the (control device number+1) and mounted on a car having a car number larger than a car number of a car, on which the VVVFs are mounted, by one. Such display is allowed because the VVVFs are mounted on only one car of the adjacent cars.

In FIG. 10, each of the display components Q1 and Q3 of the VVVFs is a first display component, and is placed in a position of the X coordinate corresponding to a car on which the VVVFs are actually mounted or a control device by which the VVVFs are actually controlled. On the other hand, each of the display components Q2 and Q4 of the VVVFs is a second display component, and is placed in a position of the X coordinate corresponding to a car resting on the right of the car on which the VVVFs are actually mounted or a control device mounted on the car resting on the right.

One motor (not shown in the figure), which is a controlled object of the VVVFs, is mounted on each of the adjacent cars. Therefore, even if two VVVFs are displayed on the display screen 30 as if the two VVVFs are mounted on cars on which two motors (not shown in the figure), which are the controlled objects, are respectively mounted, the display does not cause misunderstanding of the person viewing the display screen 30.

In FIG. 10, display components of eight doors are displayed for each of the cars or each of the control devices in accordance with the display component arrangement information shown in FIG. 8 and the arrangement rule information shown in FIG. 9.

Note that the arrangement rules shown in FIG. 9 are of one example. Like arrangement rules can be applied to other apparatuses and/or the arrangement rules can be changed according to a configuration of car-mounted apparatuses.

The system configuration information, the apparatus arrangement information, the display components, the display component arrangement information, and the arrangement rule information are input data inputted to the software generating device 1 via the input unit 2, and are stored in advance in the system-configuration-information storing unit 7, the apparatus-arrangement-information storing unit 8, the display-component storing unit 9, the display-component-arrangement-information storing unit 10, and the arrangement-rule-information storing unit 11.

On the basis of the system configuration information, the apparatus arrangement information, the display component arrangement information, and the arrangement rule information, the layout unit 3 selects a plurality of display components constituting the display screen 30, determines attribute data including arrangement positions of the display components on the display screen 30, and automatically generates layout design data of the display screen 30 including the attribute data of the display components. Note that the layout design data can include data for displaying the vertical lines and the horizontal lines connecting the display components as shown in FIG. 10 and data for displaying the cars as shown in FIG. 2. In general, sizes and colors of the display components can be set. Therefore, the attribute data can include information concerning the sizes and the colors other than the arrangement position information.

The device-number setting unit 4 associates control device numbers of the control devices A that control the apparatuses 53 represented by the display components arranged on the display screen 30 or corresponding to the display components with the display components, and creates correspondence data for making links between the display components and the control device numbers. Specifically, the device-number setting unit 4 creates the correspondence data using the apparatus arrangement information shown in FIG. 5.

The software generating unit 5 automatically generates software for generating the display screen 30 used in the display device 51 on the basis of the layout design data and the correspondence data. The software generating unit 5 can be realized using existing application software for generating software for generating a display screen. The software generating unit 5 generates software described in, for example, the C language, and stores the software in the software storing unit 12. The software is outputted via the output unit 6 and installed in the display device 51.

The output unit 6 is, for example, an output device that outputs output data to a storage medium, a display unit, and a printer. The storage medium is, for example, a CD-ROM or a DVD disk.

Figure 12:
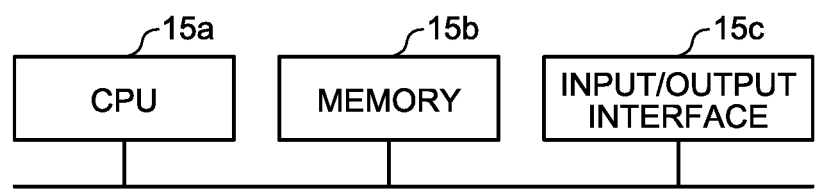
FIG. 12 is a diagram showing an example of a hardware configuration of the software generating device.

FIG. 12 is a diagram showing an example of a hardware configuration of the software generating device 1. The layout unit 3, the device-number setting unit 4, and the software generating unit 5 are realized by a CPU 15a shown in FIG. 12. The system-configuration-information storing unit 7, the apparatus-arrangement-information storing unit 8, the display-component storing unit 9, the display-component-arrangement-information storing unit 10, the arrangement-rule-information storing unit 11, and the software storing unit 12 are realized by a memory 15b. The input unit 2 and the output unit 6 realized using an input/output interface 15c of FIG. 2.

Operation in this embodiment is explained. The layout unit 3 selects a plurality of display components constituting the display screen 30 from the display-component storing unit 9 on the basis of the system configuration information and the apparatus arrangement information, determines arrangement positions of the display components on the display screen 30 on the basis of the apparatus arrangement information, the display component arrangement information, and the arrangement rule information, and automatically generates layout design data of the display screen 30 including arrangement position data of the display components. Note that the display components constituting the display screen 30 are selected for each of display screens 30.

Specifically, referring to the system configuration information, the layout unit 3 recognizes that the train is in the ten-car formation having the six-car formation and the four-car formation coupled together, and that one control device is mounted on each of the cars of the ten-car formation. Further, the layout unit 3 can specify apparatus types of apparatuses monitored and controlled by the control devices and the number of the apparatuses referring to the apparatus arrangement information. Consequently, the layout unit 3 can select a plurality of display components corresponding to the apparatuses 53, which are the monitored and controlled objects, from the display-component storing unit 9. Further, the layout unit 3 can determine arrangement positions on the display screen 30 of the selected display components on the basis of the apparatus arrangement information, the display component arrangement information, and the arrangement rule information. In this case, the layout unit 3 refers to the apparatus arrangement information, and when there is one apparatus 53 of the same type controlled by the same control device A, the layout unit 3 determines an arrangement position of the apparatus 53 on the basis of the display component arrangement information. On the other hand, the layout unit 3 refers to the apparatus arrangement information, and when there are a number of apparatuses 53 of the same type controlled by the same control device A, the layout unit 3 determines arrangement positions of the apparatuses 53 on the basis of the display component arrangement information and the arrangement rule information.

For example, each of the control devices A monitors and controls eight doors. Accordingly, the layout unit 3 determines arrangement positions of display components representing the doors on the basis of the display component arrangement information and the arrangement rule information (FIGS. 9 and 10).

Each of the control devices (1), (3), (5), (7), and (9) monitors and controls two air-conditioning control apparatuses. Accordingly, the layout unit 3 determines arrangement positions of display components representing the air-conditioning control apparatuses on the basis of the display component arrangement information and the arrangement rule information (FIGS. 9 and 10).

Similarly, each of the control devices (2), (4), and (8) monitors and controls two VVVFs. Accordingly, the layout unit 3 determines arrangement positions of display components representing the VVVFs on the basis of the display component arrangement information and the arrangement rule information (FIGS. 9 and 10).

In this way, the layout unit 3 determines the attribute data including the arrangement positions of the display components on the display screen 30, automatically generates the layout design data of the display screen 30 including the attribute data of the display components, and outputs the layout design data to the device-number setting unit 4.

Then, the device-number setting unit 4 creates the correspondence data for associating or linking control device numbers of the control devices A, which controls the apparatuses 53 represented by the display components arranged on the display screen 30, with the display components. The correspondence data are used in displaying apparatus information on the display components. That is, the correspondence data are incorporated in the software. When displaying the apparatus information on the display components, the display device 51 refers to the correspondence data and the display device 51 acquires the apparatus information from the control devices A having the control device numbers corresponding to the display components, so as to display the apparatus information on the display components.

Then, the software generating unit 5 automatically generates software for generating the display screen 30 on the basis of the layout design data and the correspondence data. In this case, when the display device 51 displays the display screen 30, the software generating unit 5 generates software to display the display screen 30 using the layout design data. That is, the software generating unit 5 reflects the layout design data on the software. For example, when a drawing function of the display components is incorporated in the software and the attribute data of the display components are passed to an argument of the drawing function, the software generating unit 5 extracts the attribute data of the display components to be drawn, from the layout design data, and sets the extracted attribute data in the argument of the drawing function.

As explained above, according to this embodiment, on the basis of the system configuration information, the apparatus arrangement information, the display component arrangement information, and the arrangement rule information, the display components constituting the display screen 30 are selected from the display-component storing unit 9, the arrangement positions of the display components on the display screen 30 are determined, and the layout design data of the display screen 30 are automatically generated. By doing so, it is possible to reduce man-hours in generating the software. In particular, even when a system configuration, apparatus arrangement, or display content is changed, it is possible to automatically generate the layout design data accordingly by changing the system configuration information, the apparatus arrangement information, the display component arrangement information, and the arrangement rule information. Therefore, it is unnecessary to undergo a process for manually rearranging and configuring the display components as in the past, and at the same time it is possible to reduce screen generation man-hours and achieve improvement of efficiency of screen generation work. For example, even when a new formation is configured by coupling two formations, it is possible to efficiently create the display screen 30 for the new formation.

According to this embodiment, not only when one and the same control device monitors and controls one apparatus of the same type but also when one and the same control device monitors and controls a plurality of apparatuses of the same type, it is possible to automatically generate software for generating the display screen 30 that displays the apparatus information.

In particular, on the display screen 30 shown in FIG. 2 or FIG. 10, when one and the same control device monitors and controls the plural apparatuses of the same type, for the display components representing the doors, the arrangement positions are shifted in the X-coordinate axis direction, the Y-coordinate axis direction, or both of the directions with respect to the defined position given by the display component arrangement information, thereby to display the plural display components without overlapping the components with one another.

Concerning the air-conditioning control apparatus or the VVVF, an apparatus of the same type is not mounted on the adjacent car. For this reason, the first display component is placed in the defined position given by the display component arrangement information, while the second display component is placed in the position of the X coordinate corresponding to the adjacent car on which the apparatus of the same type is not mounted. In this way, it is possible to efficiently place the second display component by virtue of making use of a circumstance in which the apparatus of the same type is not mounted on the car adjacent to the first one. Moreover, since the controlled object of the air-conditioning control apparatus or the VVVF is mounted on the adjacent car on which the apparatus of the same type is not mounted, it is reasonable to place the second display component in the position of the X coordinate corresponding to the adjacent car.

Note that, in the illustrated example in FIG. 2 or FIG. 10, one brake is mounted on each of the cars. However, two brakes are mounted thereon depending on a car. In this case, a first display component representing one brake of the two brakes can be placed in the defined position, while a second display component representing the other brake of the two brakes can be placed in a position same as the position of the first display component in the X-coordinate axis direction, and between the display component of the SIV or the VVVF and the first display component. That is, the second display component is displaced in the Y-coordinate axis direction and arranged. In this case, the two display components representing the two brakes are reduced in size to prevent the two display components from overlapping display components of other apparatus types.

In this embodiment, the correspondence data for associating the display components arranged on the display screen 30 with the control device numbers are created by the device-number setting unit 4. By so doing, it is unnecessary to manually set the control device numbers in the display components on the display screen of the user interface design tool as in the past, thereby making it possible to prevent a setting error. Note that, a configuration in which the device-number setting unit 4 is not provided is also possible.

Figure 11:
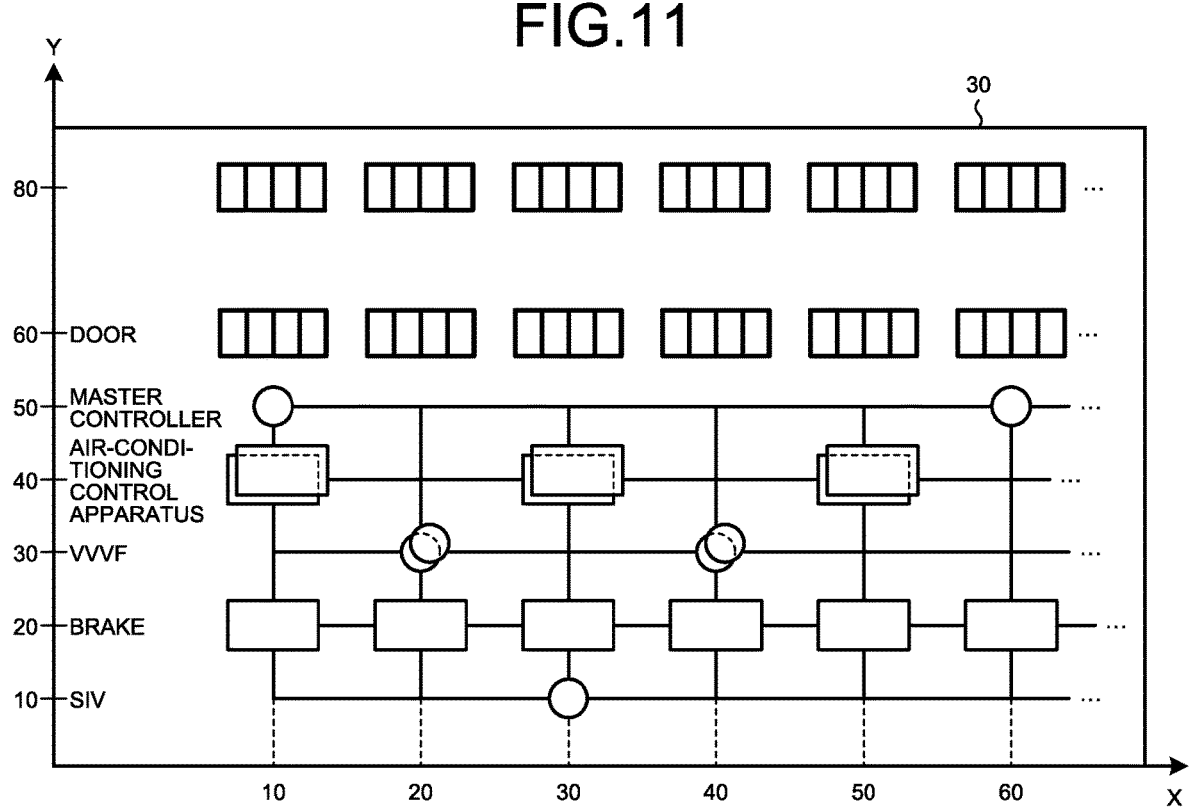
FIG. 11 is an illustration showing another configuration example of the display screen.

FIG. 11 is an illustration showing another configuration example of the display screen 30. As shown in FIG. 11, two display components representing two air-conditioning control apparatuses monitored and controlled by one and the same control device are displayed to partially overlap each other. Similarly, two display components representing two VVVFs monitored and controlled by one and the same control device are displayed to partially overlap each other. Note that the arrangement rule information is given such that the display shown in FIG. 11 is realized. Even in such a display method, by generating software to make it possible to select, on the display screen 30, which of the two display components overlapping each other is placed in the front, the two display components are, arranged in the defined positions while any of the display components can be visually recognized according to necessity.

INDUSTRIAL APPLICABILITY

As explained above, the present invention is useful for a software generating device that automatically generates software for generating a display screen for railroad vehicle information.

REFERENCE SIGNS LIST

1 software generating device; 2 input unit; 3 layout unit; 4 device-number setting unit; 5 software generating unit; 6 output unit; 7 system-configuration-information storing unit; 8 apparatus-arrangement-information storing unit; 9 display-component storing unit; 10 display-component-arrangement-information storing unit; 11 arrangement-rule-information storing unit; 11a, 11b arrangement rule information; 12 software storing unit; 30 display screen; 30a upper part; 30b lower part; train; 51 display device; 53 apparatus.

The invention claimed is:

1. A software generating device that automatically generates software for generating a display screen of a display device in a train in which control devices communicatively connected to one another are mounted on cars, a plurality of apparatuses mounted on the cars is monitored and controlled by the control devices, and the display device capable of displaying apparatus information of the apparatuses is mounted on a driver's cab, the software generating device comprising:
    a memory storing:
        system configuration information for giving an arrangement configuration of the control devices in a formation of the train;
        apparatus arrangement information for giving an apparatus type of a monitored and controlled object and the number of apparatuses of the apparatus type for each of the control devices;
        display components by which apparatus information of the apparatuses can be displayed on the display screen;
        display component arrangement information for defining arrangement positions of a plurality of display components arranged on the display screen; and
        arrangement rule information for giving exceptional rules, which are arrangement rules for display components, applied in addition to the display component arrangement information in determining, when a plurality of apparatuses of the same type is monitored and controlled by one and the same control device, arrangement positions of a plurality of display components respectively representing the apparatuses; and
    a processor configured to:
        select a plurality of display components constituting the display screen, determine arrangement positions of the display components on the display screen, and automatically generate layout design data of the display screen, on the basis of the system configuration information, the apparatus arrangement information, the display component arrangement information, and the arrangement rule information; and
        automatically generate software for generating the display screen on the basis of the layout design data,
    wherein on the basis of the apparatus arrangement information, when there is one apparatus of the same type monitored and controlled by one and the same control device, the processor determines an arrangement position of the apparatus on the basis of the display component arrangement information, when there is a plurality of apparatuses of the same type monitored and controlled by one and the same control device, the processor determines arrangement positions of the apparatuses based on the display component arrangement information and the arrangement rule information,
    when there are apparatuses having the same type and associated with the same car, corresponding apparatus information is displayed on the display screen in both a vertical arrangement and a horizontal arrangement,
    when there are apparatuses having the same type and associated with different cars, corresponding apparatus information is displayed on the display screen in a horizontal arrangement, and
    when there are apparatuses having different types and associated with the same car, corresponding apparatus information is displayed on the display screen in a vertical arrangement.

2. The software generating device according to claim 1, wherein
    in the display component arrangement information, arrangement positions of the display components arranged on the display screen are defined by first and second coordinates orthogonal to each other set on the display screen, arrangement positions of the display components in a first coordinate axis direction are defined, for each of the control devices that control the apparatuses represented by the display components, by an order of car numbers of cars on which the apparatuses and the control devices are mounted, and arrangement positions of the display components in a second coordinate axis direction are defined for each of apparatus types of the apparatuses represented by the display components, and in the arrangement rule information, when a plurality of apparatuses of the same type are monitored and controlled by one and the same control device, arrangement positions of the display components are given on the basis of arrangement positions defined by the display component arrangement information concerning the apparatus types of the apparatuses such that the arrangement positions of the display components are different from one another.

3. The software generating device according to claim 2, wherein, in the arrangement rule information, arrangement positions of display components respectively representing a number of apparatuses of the same type are defined such that the display components are displayed to partially overlap each other on the display screen.

4. The software generating device according to claim 2, wherein, in the arrangement rule information, arrangement positions of the display components respectively representing the apparatuses of the same type are given such that each of the display components is displayed as a whole on the display screen.

5. The software generating device according to claim 4, wherein
two apparatuses of the same type are mounted on one car of cars adjacent to each other and an apparatus of a type same as the type of the two apparatuses is not mounted on the other car of the adjacent cars, and
in the arrangement rule information, an arrangement position of a display component representing one apparatus of the two apparatuses is given by an arrangement position defined by the display component arrangement information, and an arrangement position of a display component representing the other apparatus of the two apparatuses is given in the second coordinate axis direction by an arrangement position defined by the display component arrangement information and given in the first coordinate axis direction by an arrangement position defined by the display component arrangement information concerning an apparatus of a monitored and controlled object of the control device mounted on the other car.

6. The software generating device according to claim 5, wherein other two apparatuses, which are controlled objects of the two apparatuses, are respectively mounted on the adjacent cars one by one.

7. The software generating device according to claim 6, wherein
the apparatus is an air-conditioning control apparatus or a VVVF inverter, and
one of the other two apparatuses is an air conditioner that is a controlled object of the air-conditioning control apparatus, or a motor that is a controlled object of the VVVF inverter.

8. The software generating device according to claim 1, wherein
the control devices are provided with control device numbers, which are serial numbers, given to specify the control devices, and
the processor is configured to associate control device numbers of the control devices controlling the apparatuses represented by the display components arranged on the display screen with the display components, and create correspondence data for linking between the display components and the control device numbers.

\* \* \* \* \*